US011968746B2

(12) United States Patent
Phan et al.

(10) Patent No.: US 11,968,746 B2
(45) Date of Patent: Apr. 23, 2024

(54) METHOD AND SYSTEM TO OPTIMIZE POWER CONSUMPTION OF IOT DEVICES FOR USIM REMOTE MANAGEMENT

(71) Applicant: THALES DIS FRANCE SAS, Meudon (FR)

(72) Inventors: Ly Thanh Phan, La Ciotat (FR); Vincent Dany, La Ciotat (FR); Jean-François Gros, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 110 days.

(21) Appl. No.: 17/612,180

(22) PCT Filed: Apr. 7, 2020

(86) PCT No.: PCT/EP2020/059848
§ 371 (c)(1),
(2) Date: Nov. 17, 2021

(87) PCT Pub. No.: WO2020/233888
PCT Pub. Date: Nov. 26, 2020

(65) Prior Publication Data
US 2022/0225077 A1    Jul. 14, 2022

(30) Foreign Application Priority Data
May 20, 2019 (EP) .................................. 19305639

(51) Int. Cl.
*H04W 8/18* (2009.01)
*H04W 52/02* (2009.01)
(52) U.S. Cl.
CPC ....... *H04W 8/183* (2013.01); *H04W 52/0209* (2013.01)

(58) Field of Classification Search
CPC .......................... H04W 8/183; H04W 52/0209
See application file for complete search history.

(56) References Cited

U.S. PATENT DOCUMENTS

2011/0201343 A1* 8/2011 Pinheiro ............... H04W 88/02
455/450
2015/0087322 A1* 3/2015 Maguire ............... H04W 60/06
455/450

(Continued)

OTHER PUBLICATIONS

International Search Report (PCT/ISA/210) and Written Opinion (PCT/ISA/237) dated Jun. 5, 2020, by the European Patent Office as the International Searching Authority for International Application No. PCT/EP2020/059848 (WO2020/233888)—[10 pages].

(Continued)

*Primary Examiner* — Barry W Taylor

(57) ABSTRACT

Provided is a method to operate a subscriber identification module connected to a communication equipment configured to operate in a cellular network and communicatively coupled with a remote server. The method includes receiving from the communication equipment an information element indicating a time range relating to a suspend time of the communication equipment, receiving from the remote server a target access time information element indicating an expected time for an access request from the subscriber identification module to the remote server, and determining a suspension time period considering the suspend time range. The method includes providing to the communication equipment the suspension time period, and in case after resuming from the suspension instructed by the communication equipment the accumulated duration of at least one successive time period derived from the suspension time period exceeds the target access time, sending a polling message.

14 Claims, 5 Drawing Sheets

(56) References Cited

U.S. PATENT DOCUMENTS

| | | | | |
|---|---|---|---|---|
| 2016/0285493 | A1* | 9/2016 | Veneroso | H04L 67/306 |
| 2019/0261270 | A1* | 8/2019 | Wu | H04W 52/0212 |
| 2022/0053448 | A1* | 2/2022 | Velev | H04W 8/183 |
| 2022/0312531 | A1* | 9/2022 | Lovlekar | H04W 76/20 |
| 2023/0080113 | A1* | 3/2023 | Hong | H04W 8/183 |
| | | | | 370/329 |

OTHER PUBLICATIONS

Gsm Association: "NB-IoT Deployment Guide to Basic Feature set Requirements Version 1.0", Aug. 2, 2017 (Aug. 2, 2017), pp. 1-30, XP055635368, Retrieved from the Internet: URL:https://www.gsma.com/newsroom/wp-content/uploads/CLP.28-v2.0.pdf [retrieved on Oct. 23, 2019] —figure 2—Section 6.1 "PSM configurations"; p. 12-p. 14.

* cited by examiner

METHOD AND SYSTEM TO OPTIMIZE POWER CONSUMPTION OF IOT DEVICES FOR USIM REMOTE MANAGEMENT

FIELD OF THE INVENTION

The present invention relates to a method to operate a subscriber identification module. It further relates to a subscriber identification module implementing said method.

The invention also pertains to a remote server communicatively coupled to said subscriber identification module. It further relates to a method implemented by the remote server. the invention further relates to a system comprising said subscriber identification module and said remote server.

BACKGROUND OF THE INVENTION

Generally, in the field of wireless cellular communication it is known that for communication equipments operating in a cellular network the connected subscriber identification modules are remotely managed by the mobile operators. As part of such remote management the mobile operators update data and/or software components on the subscriber identification modules. Such subscriber identification modules are in particular USIMs, eUICCs or the like.

For that remote management it is in particular known to apply a push mode, e.g. via SMS, or a pull mode from the USIM. A couple of methods are known for both options.

However, in the recent evolvement of cellular networks new extension to the core specifications e.g. of 4G, like NB-IoT, Cat-M, Cat-1 are introduced, that are supposed to be continued in future generations of telecommunication standards as well (e.g. 5G and beyond). These extensions have—in particular due to their focus on optimizing the behavior of the addressed communication equipments, like IoT devices—limitations that rule out some of the known methods.

In particular the requirement for long sleep modes, like known with PSM, long eDRX cycles or relaxed monitoring, possibly required short response times are not available anymore.

The remaining method is by sending an SMS from the mobile operator, in particular for triggering setting up a update channel e.g. via BIP.

However, for some of the extensions mentioned before it is not mandatory anymore to support SMS transport by the cellular network operators. And it is known that some cellular networks operators indeed skipped the SMS support, e.g. for NB-IoT. This is in particular true for future standards where SMS are only supported via IMS, which is not supported by the low-capability devices as well.

The obvious approach to face this situation would be to poll for remote management requests from the mobile operator each time a communication equipment wakes up. However this approach would result in a flooding of the cellular networks with polling messages to the remote servers for remote management, in most cases probably in vain. Both for the mobile operator and for the communication equipment this behavior would be disadvantageous, as for the latter it would put at risk the power consumption budget, and for the former additional signalling without any payload would be needed to be managed, which in extreme scenarios could even risk stability of the cellular network.

It is therefore the goal of present invention to overcome the mentioned disadvantages and to propose a solution for an improved remote control of the subscription identification modules of communication equipments operating in cellular networks like the ones described before.

Further alternative and advantageous solutions would, accordingly, be desirable in the art.

SUMMARY OF THE INVENTION

For this it is according to a first aspect of the invention suggested a method for a subscriber identification module according to claim 1. It is further suggested according to a second aspect of the invention a subscriber identification module according to claim 7. According to a third aspect of the invention it is proposed a remote server according to claim 10. It is further as a fourth aspect of the invention proposed a method for said remote server according to claim 13. According to the fifth aspect of the invention it is proposed a system according to claim 14.

According to the first aspect of the invention it is proposed a method to operate a subscriber identification module connected to a communication equipment, which is configured to operate in a cellular network, the subscriber identification module being communicatively coupled with a remote server, the method comprising the steps of:

receiving from the communication equipment an information element indicating a time range relating to a suspend time of the communication equipment, hereinafter the suspend time range, receiving from the remote server a target access time information element indicating an expected time for an access request from the subscriber identification module to the remote server, hereinafter the target access time, determining a suspension time period considering the suspend time range, providing to the communication equipment said suspension time period in response to receiving a suspend instruction from the communication equipment, in case after resuming from the suspension instructed by the communication equipment the accumulated duration of at least one successive time period derived from the suspension time period exceeds the target access time, sending a polling message to said remote server by means of said communication equipment.

The method relates to a subscriber identification module which is in its general principle known since the early days of cellular communication. It comprises a secured memory unit for storing at least access credentials for a cellular network. Further the subscriber identification module is in particular removably connectable to a communication equipment, like a smartphone or MTC resp. IoT device. Subscriber identification modules are known as common SIMs, USIMs, UICCs and eUICCs. Today not necessarily a removable card is necessary, but also an embedded chip in a device or a secured chip component which covers the functionality of a subscriber identification module is encompassed by the invention.

The subscriber identification module is typically issued and preconfigured by a cellular network operator, or at least a virtual network operator, and is ready to be used when connected to the communication equipment to allow registering and operating with the cellular network of the issuing network operator.

The subscriber identification module is additionally communicatively coupled with a remote server. This means, that a communication channel, via communication equipment and cellular network components—in particular transparently—is set up. The remote server is situated within the cellular network, or at least accessible through the cellular network.

The remote server is in particular established by the network operator in order to perform remote modifications of the subscriber identification module. Such remote modification are critical operational requirements for the mobile operator in order to modify behavior of the subscriber identification module and the connected communication equipment, in particular in order to maintain stability of the cellular network.

By now the variants of push mode, e.g. via SMS or IP based, or a pull mode from the USIM, by means of polling triggered from the subscriber identification module, are generally known.

However for communication equipments operating in bandwidth-reduced categories like NB-IoT, Cat-M, Cat-1 many of the variants above are however not applicable, e.g. either due to unavailability of IP based communication or not supported SMS.

It is shown that frequent polling will endanger power consumption requirements and also raise congestions issues for the cellular network, therefore it requires a solution to comply with all these limitations.

Here comes the invention into play. The suggested inventive method allows a remote control of the subscriber identification module with limited side effects. For that the method starts with receiving at the subscriber identification module an information element indication a time range relating to a suspend time of the communication equipment (which comprises a mobile equipment and the subscriber identification module). This time range is called suspend time range.

The suspend time range preferably comprises a maximum and a minimum time value which are allowed for suspending the communication equipment. Alternatively one of a minimum time value or maximum time value and an offset value is used for depicting the time range.

The suspending of the communication equipment is one feature for reduced power consumption. In particular for IoT devices comparably rare data transmissions are carried out, e.g. one measurement a day. In particular such types of IoT devices are often fixed installed, therefore not moving. After the suspension period terminates it is very likely that the communication equipment is camping on the same base station. Hence no mobility interaction, like scanning for a better suited base station is needed, at least not permanently. Further it is not expected to call such IoT devices from outside. Therefore even paging activity can be dramatically reduced.

Hence, the communication equipment tries to suspend the operation.

However, in order to avoid, that the polling of the subscriber identification module thwarts the power consumption reduction the communication equipment needs to coordinate with the subscriber identification module accordingly.

This is what is achieved with said information element, which is exchanged through the known communication channels between communication equipment and subscriber identification module.

According to the invention the step of providing the suspension time period is carried out in response to receiving a suspend instruction from the communication equipment.

Means, the subscriber identification module receives a suspend instruction accompanied by said information element with the suspend time range. The suspend command is a known command as specified in ETSI TS 102 221.

Additionally, the subscriber identification module is supposed to receive from the remote server a target access time information element, which indicates an expected time for an access request, that is by means of a polling message. This is called the target access time.

Preferably this information element is received by the subscriber identification module at the time of first registration, in particular prior resp. unrelated to the suspend message resp. suspend time range reception from the communication equipment.

The subscriber identification module then determines a suspension time period considering the suspend time range. This is in particular carried out by means of a suspension time function available in the subscriber identification module.

Preferably the suspension time period further considers the target access time. The suspension time period is consequently provided to the communication equipment. This is part of the negotiation between both entities, in particular in response to the suspend instruction. Potential additional message exchange is encompassed by preferred embodiments of the invention, until communication equipment and subscriber identification module agree on a suspension time.

Preferably the negotiated value leans towards the maximum of the suspension time range, in order to save power consumption as much as possible.

Then the communication equipments suspends operation, which also turns down activity of the subscriber identification module.

After resuming following the agreed suspension time period the subscriber identification module checks if the target access time to access the remote server has expired.

For that it is preferably calculated that the accumulated duration of successive suspend operation exceeds the target access time.

If this is the case the method comprises that the subscriber identification module sends a polling message to the remote server, which is done by means of the communication equipment, which provides the transceiver circuitry for communicating with the base station of the cellular network.

Preferably the polling message by the USIM and the response from the remote server (polling exchange) may be limited to the strict minimum (i.e. One UDP request packet from USIM to remote server and one UDP packet response by remote server back containing the Access Time value, and the next polling time), so that Cellular IoT Control Plane optimization per 3GPP TS 23.401 could be used for the polling exchanges minimizing the power consumption and radio resource usage at the side of the communication equipment.

The inventive solution addresses well the needs of the communication equipment and the remote server and finds a way of synchronizing both the suspension and the access time for polling.

In a further advantageous embodiment it is proposed that the polling message comprises a request for at least one remote control instruction, and the method further comprises the steps of receiving a response message comprising at least one remote control instruction, and carrying out said at least one remote control instruction.

This embodiment comprises the steps of sending the polling message and receiving the expected response, in case the remote server has a remote control instruction for this subscriber identification module available. Then this remote control instruction would be transmitted as part of a message to the subscriber identification module.

This is in particular advantageous in conjunction with another preferred embodiment. According to this embodiment it is proposed that the step of sending the polling message comprises sending an indication relating to at least one of the suspend time range and the suspension time period, the method further comprising the step of receiving an updated target access time information element in response to the polling message.

As part of this the subscriber identification module sends with or in conjunction with the polling message an indication relation to the suspend time range and/or the suspension time period. This allows the remote server to align the suspend time with the target access time.

Consequently the subscriber identification module expects in response to receive an updated target access time information element.

This does not have to be the case for each occasion of sending the polling message, but is in particular at the beginning of the operation helpful to synchronize the polling with the suspension intervals.

Preferably this leads to consecutive suspension periods which fit exactly in the target access time duration, and hence lead to a well synchronized behavior.

This is in particular advantageous as it does not cause additional signalling while the resources are well used.

Preferably the time period derived from the suspension time period equals the suspension time period.

This embodiment simplifies the negotiation of the suspension between communication equipment and subscriber identification module. As the suspension time period is the result of the suspension time function, and the suspension time function is supposed to be launched by the cellular network operator, it is preferred to follow the outcome also on communication equipments side. This might be in particular part of network friendly behavior, which is expected from communication equipments to be compliant with network policies.

In case of special situations resp. requirements of the communication equipment it may however be advantageously to consider this for alternative time periods than calculated by the suspension time function.

According to another preferred embodiment it is proposed that the step of determining the suspension time period is carried out by means of a suspension time function, comprising the step of adjusting the suspension time function considering at least one of:
the actual access time period
the updated target access time information element,
the target access time information element,
the suspend time range,
the suspension time period and
the time period derived from the suspension time period.

The determination of the suspension time period in the subscriber identification module is according to that embodiment carried out by a suspension time function.

Preferably the suspension time function is delivered with the subscriber identification module, when it is issued. The subscriber identification module is preferably standardized and may provide the possibility to be parameterized with additional criteria.

The embodiment comprises that further updates may appear afterwards, in order to align with the conditions of the communication equipment, the remote server etc. Such updates may both relate to the parameterization and to changes in determination instructions, which may effectively mean a software change.

The objective of the update is to minimize the error between final accumulated suspension time period and the target access time. That means, in the ideal case the last suspension time is expected to terminate exactly when the target access time is due. This is preferably the case in order to avoid congestion and allow a distribution of polling requests from different communication equipments, which the remote server may govern by providing timely distributed target access times to different communication equipments operating in a cellular network, in particular on one base station.

For that update one or more of the mentioned respective parameter are to be taken into account.

According to an advantageous embodiment the step of receiving an updated target access information element further comprises receiving at least one instruction for adjusting the suspension time function.

Such update is according to this embodiment carried out by receiving instructions from the remote server, preferably in conjunction with the regular polling mechanism. The remote server for the sake of the cellular network is best suited to take the necessary steps for achieving said objective.

Alternatively update instructions, at least for parameters may be provided by the communication equipment or by components of the subscriber identification module itself.

According to the second aspect of the invention it is proposed a subscriber identification module connected to a communication equipment, which is configured to operate in a cellular network, wherein the subscriber identification module is communicatively coupled with a remote server, wherein the subscriber identification module is configured to:
receive from the communication equipment an information element indicating a time range relating to a suspend time of the communication equipment, hereinafter the suspend time range,
receive from the remote server a target access time information element indicating an expected time for an access request from the subscriber identification module to the remote server, hereinafter the target access time,
determining a suspension time period considering the suspend time range,
provide to the communication equipment said suspension time period in response to the reception of a suspend instruction from the communication equipment,
in case after resuming from the suspension instructed by the communication equipment the accumulated duration of at least one successive time period derived from the suspension time period exceeds the target access time:
send a polling message to said remote server by means of said communication equipment.

The subscriber identification module according to this aspect of the invention is supposed to be connected to a communication equipment, in particular removably. It comprises memory units for at least storing subscriber credentials and processing circuitry for carrying out calculation steps of software applications, preferably stored in said memory units.

The subscriber identification module is configured to set up communication channels by means of the communication equipments transceiver circuitry to cellular network components, in particular a remote server.

The second aspect of the invention shares the advantages of the first aspect of the invention.

According to the third aspect of the invention it is proposed a remote server accessible by a cellular network, communicatively coupled to at least one subscriber identification module connected to a communication equipment which is configured to operate in said cellular network, wherein the remote server is configured to:

provide a target access time information element indicating an expected time for an access request, hereinafter the target access time, to said subscriber identification module, receive a polling message at said target access time.

This embodiment relates to a remote server situated in conjunction with a cellular network. Preferably the remote server is part of the cellular network, at least under control.

The remote server is configured to receive through the cellular network messages, in particular polling messages from subscriber identification modules according to the second aspect of the invention.

The remote server is further configured to send messages through the cellular networks to such subscriber identification modules.

Preferably the remote server comprises memory units like a database that is supposed to store remote control directives that are supposed to be sent to said subscriber identification modules.

Typically the remote server is capable of initiatively send instruction messages to subscriber identification modules, or at least messages for triggering a polling message.

However for certain subscriber identification modules, in particular those coupled to certain types of communication equipments with reduced communication capabilities, respectively those communication equipments camping on certain base stations with reduced communication capabilities, the remote server is configured to send such instruction messages only in response to a polling message.

Consequently as part of a communication session the remote server is configured to provide a target access time information element to at least one subscriber identification module. Said target access time indicates an expected time period for an access request, in particular a polling message.

Hence, during said target access time the remote server is prepared to receive a polling message from said subscriber identification module.

Being prepared to receive a polling message in particular comprises, that potential instructions for said subscriber identification module are by then ready to be provided in response to the polling message.

Further it is suggested according to another preferred embodiment that said polling message further comprising an indication relating to the suspension time period, wherein the remote server is further configured to:

determine an updated target access time information element, providing said updated target access time information element in response to said polling message to the subscriber identification module.

According to this embodiment the remote server receives in conjunction with the polling message an indication from the subscriber identification module concerning the suspension time period.

With this information the remote server, when it is the first message, gets knowledge about the need to suspend operation at the subscriber identification module. This is preferably noted in the database, that the subscriber identification module is connected to a bandwidth-reduced communication equipment.

Second, with this indication the remote server gets knowledge about the suspend time, in particular in relation to the target access time.

Hence the remote server has the opportunity to adjust both.

As the remote server manages a plurality of subscriber identification modules, it cannot only rely on the suspend time period and fully follow with the setting of the target access time the guidance from the subscriber identification module, respectively the communication equipment.

Therefore when providing an updated target access time the times may still not fully fit, but it is then on the subscriber identification module and/or the communication equipment to find a suspension time period that fits better to the target access time.

According to a preferred embodiment it is proposed that the remote server is further configured to consider at least one of the received indication relating to the suspend time period and the target access time for determining and submitting to the subscriber identification module at least one instruction to the subscriber identification module.

With this embodiment the remote server additionally provide instructions to the subscriber identification module relating to updating a suspension time function. The suspension time function is operated in the subscriber identification module for determining the suspension time period.

For aligning the suspension time period with the target access time provided by the remote server as well, this embodiment is advantageous as it instructs the subscriber identification module and the communication equipment to look about the remote server's requirements for determining its suspension time period.

This is advantageous as it may be more complicated for the remote server to realign all communication equipments signalling in conjunction with the remote control of the subscriber identification module than for the communication equipment to align the instructions of the remote server.

With this embodiment this is seamlessly achieved without any remarkable negative impact for the communication equipment.

Hence the objective to synchronize suspension of the communication equipment and the connected subscriber identification module and the target access time of the remote server for remote control is fully achieved and allows a better communication taking into account the requirements of all involved parties.

According to the fourth aspect of the invention it is proposed a method for operating a remote server accessible by a cellular network, the remote server being communicatively coupled to at least one subscriber identification module connected to a communication equipment which is configured to operate in said cellular network, the method comprising the steps for the remote server of:

providing a target access time information element indicating an expected time for an access request, hereinafter the target access time, to said subscriber identification module, receiving a polling message at said target access time.

The fourth aspect of the invention shares the advantages of the third aspect of the invention.

According to the fifth aspect of the invention it is proposed a system comprising a remote server according to the third aspect of the invention and at least one subscriber identification module according to the second aspect of the invention.

This aspect of the invention shares the advantages of the mentioned second and third aspect of the invention.

As it is shown this invention advantageously solves the depicted problem and offers a solution that aligns the requirements of remote server, cellular network, communication equipment and subscriber identification module, without putting a remarkable burden on one of the parties, in order to allow remote control of bandwidth-reduced communication equipments operating on base stations that in particular do not allow other communication means for this purpose.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a subscriber identification module 1 in working relationship to a remote server 4 according to an exemplifying embodiment of the invention.

Figure 1:
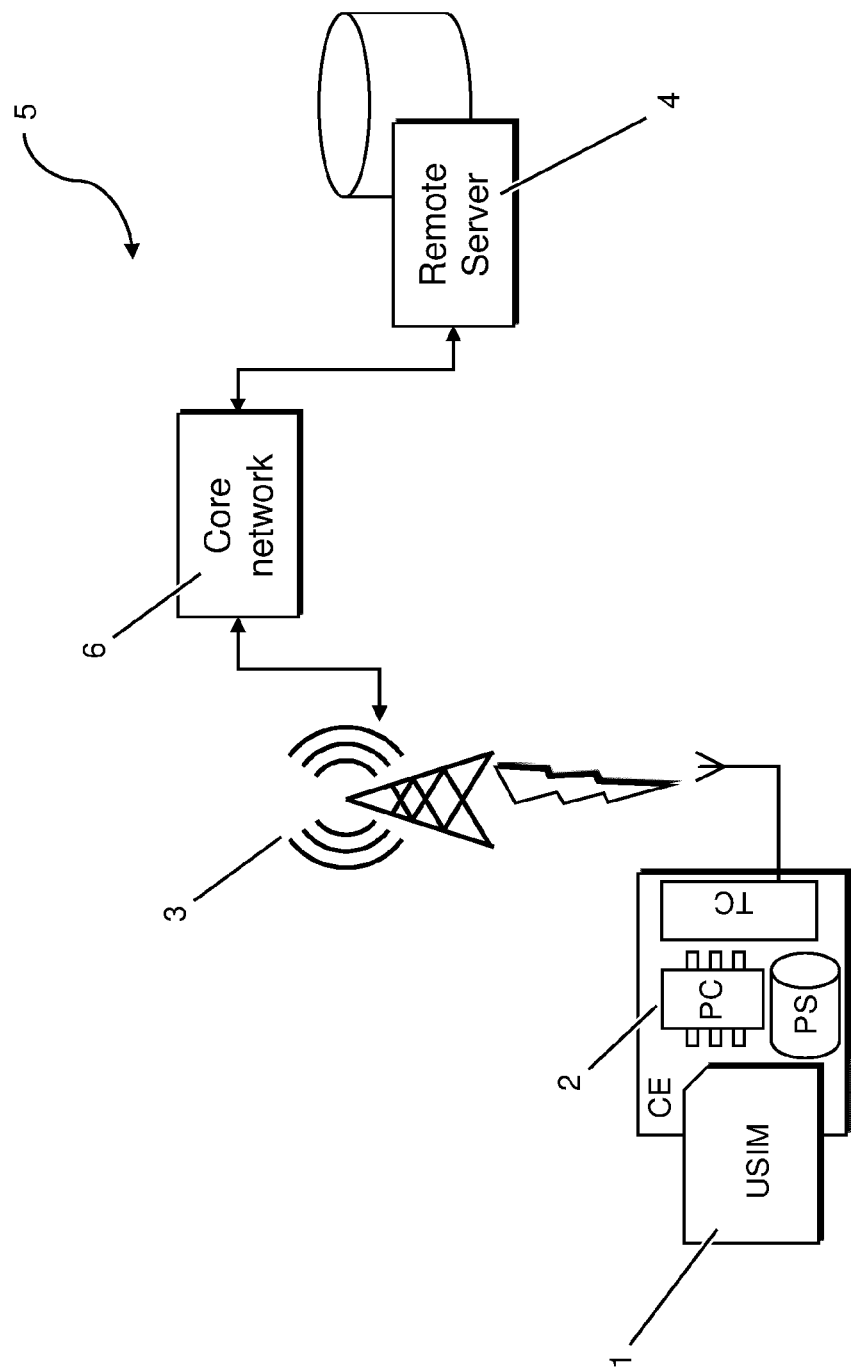
FIG. 1 represents a subscriber identification module of the type to which the present invention is applied as an embodiment in conjunction with a remote server.

The subscriber identification module 1, in particular a USIM, UICC, eUICC etc. is connected to a communication equipment 2 (UE). This is typically an IoT device, that is a connected or smart device which has a certain task like carrying out measurements and regularly reporting such measurements to a server via a cellular network.

The subscriber identification module 1 comprises a memory unit and processing circuitry for carrying out operations, like apps.

The communication equipment 2 comprises processing circuitry PC and transceiver circuitry TC. The communication equipment 2 further comprises a power supply PS. The processing circuitry PC controls behavior of the communication equipment 2, including the communication tasks. Those communication tasks are carried out by the transceiver circuitry TC, which comprises all necessary components to receive and transmit radio signals to/from a base station 3 from a cellular network 5.

For doing so the communication equipment 2 accesses the connected subscriber identification module 1 in order to ascertain authentication credentials for registering at the cellular network 5 once it wants to initially camp on base station 3.

The cellular network 5 comprises a plurality of base stations 3, in particular those for different cellular technology standards, like a base station BS for 2G, nodeB for 3G, eNodeB for 4G or gNodeB for 5G, and beyond.

The base stations 3 have access to at least one component of resp. providing access to the core network 6. With the core network 6, in particular through central databases like HSS/HLR the cellular network 5 can look up, if the requesting communication equipment 2 is eligible for accessing the cellular network 5 based on the authentication credentials.

Through further components access is ascertained to remote server 4. Depending upon if this remote server is situated in the cellular network 5 or associated to it, more core components may be involved. The remote server 4 typically has access to a database in particular for storing information related to subscriber identification modules.

The remote server 4 is in particular configured to carry out remote control functions for the subscriber identification module 1, that is modification of data stored in the subscriber identification module.

Preferably the communication equipment 2 resp. the subscriber identification module 1 is preconfigured with the address to reach the remote server 4. This is typically an IP address or a server name which can be resolved through a name server in the cellular network 5.

According to the exemplifying embodiment the communication equipment 2 is a bandwidth reduced communication equipment operating in a limited bandwidth technology extensions to the 4G core specifications like NB-IoT or Cat-M. Further it is powered by a removable battery as power supply PS, which is expected to last a couple of years. For that the communication equipment 2 regularly activates a suspend mode where no communication is carried out.

This suspend mode affects the subscriber identification module 1 as well, that means remote control instructions from the remote server 4 are only receivable in the active phases, after resuming from a suspend period.

Hence the communication equipment 2 is operating in a mode that favors to poll for information from the remote server 4, including remote control instructions triggered by the subscriber identification module 1.

That situation makes it necessary to align the suspend/resume occurrences timely with remote control instruction reception.

Figure 2:
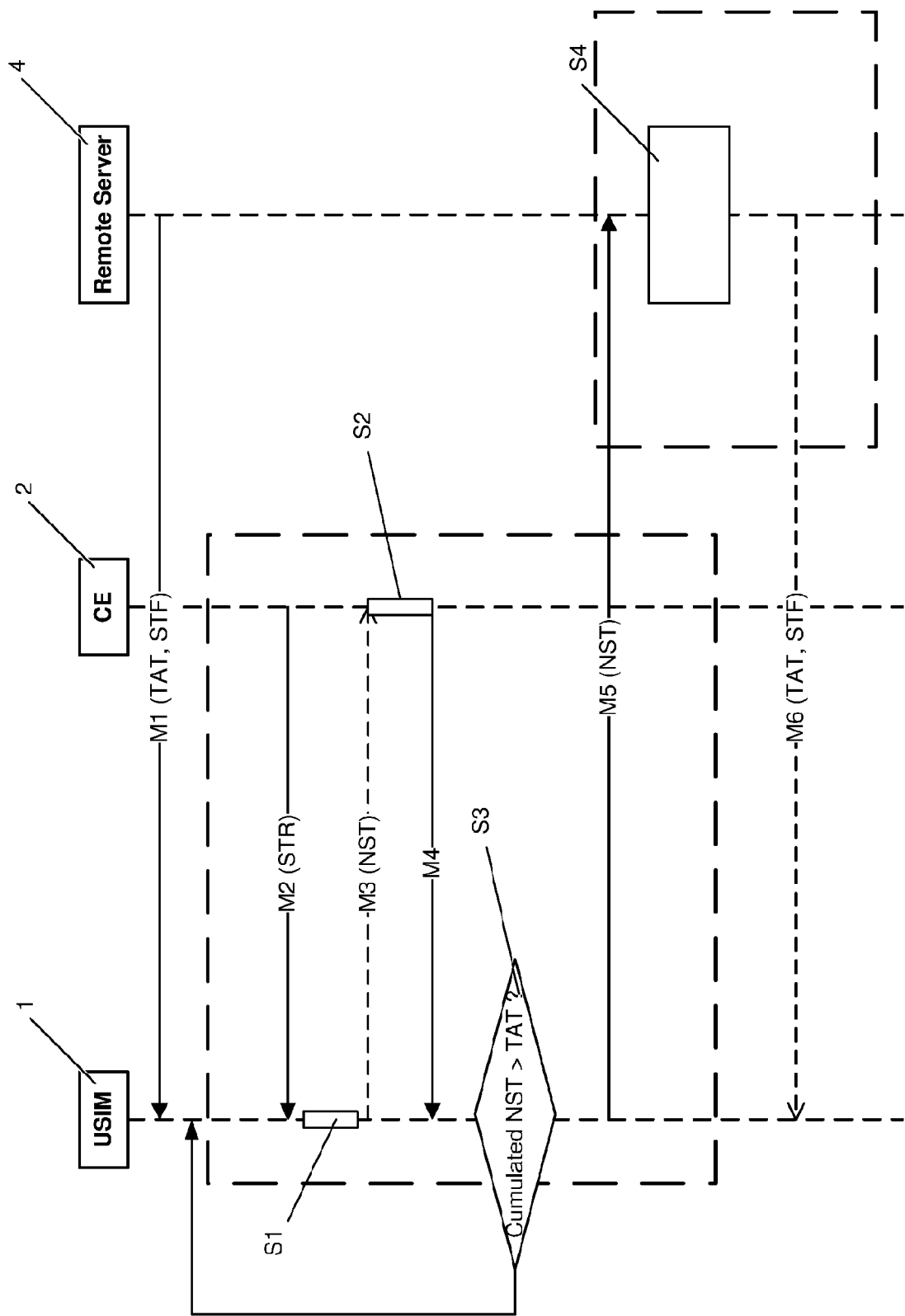
FIG. 2 shows a first sequence diagram showing a message flow according to an embodiment of the inventive method.

FIG. 2 shows in a sequence diagram an exemplifying embodiment for achieving this alignment.

Here some of the actors from FIG. 1 are shown, which is the subscriber identification module (USIM) 1, the communication equipment (UE) 2 and the remote server 4. Of course more components are typically involved in each data transmission between the shown parties, in particular cellular network 5 components as shown before, but omitted for clarification purposes The message flow starts with message M1, which provides a target access time TAT to the USIM 1. The target access time is provided in a message as target access time information element, coding the target access time TAT. The target access time TAT indicates to the USIM 1 when it expects to receive an access request for getting instructions for remote control of the USIM 1. The target access time therefore marks a point in time or time range indicating when the remote server 4 is expecting an access request from this USIM 1.

By distributing the target access times for many communication equipments resp. USIMs, in particular those camping on specific base station 3, the remote server 4 has the chance to avoid peak times when a large amount USIMs are sending their requests, e.g. at the full hour.

Additionally in this embodiment the message M1 comprises a suspension time function, resp. a parametrization of such a suspension time function STF.

Preferably this message M1 is submitted in an initialization mode, when the communication equipment was not yet ready to activate a suspend mode. Alternatively the message is provided in response to a request message from the communication equipment 2, resp. the USIM.

The USIM 1 handles the received information, preferably stores them in its non-volatile memory.

After some time the communication equipment 2 submits a suspend message M2 to the USIM 1, which indicates to the USIM that it is supposed to suspend operation and power down. The suspend command is a known command in USIM/UE communication.

The suspend message M2 allows to provide parameter, in this case it is provide a suspend time range STR which indicates a range for how long the communication equipment 2 plans to suspend communication. This is in particular provided by means of a maximum and a minimum suspend time.

The longer the suspend time, the more power consumption reduction is in the normal course of action achieved.

In response the USIM 1 determines in step S1 a negotiated suspension time period NST, which is determined by means of the suspension time function STF. As parameters of the suspension time function preferably the suspend time range STR is used.

With the response message M3 the USIM 1 provides the negotiated suspension time period NST. The negotiation however may require more messages between both the communication equipment 2 and the USIM 1, which are not shown here.

In step S2 then the communication equipment 2, and of course the USIM 1 are powered off, which means no communication request like paging etc. from the cellular network 5 will be received.

Step S2 lasts approximately the time indicated with the negotiated suspension time period NST.

With resume message M4 the communication equipment 2 informs the USIM 1 about the termination of the suspend period.

Now it is checked in step S3 if the cumulated suspend times exceed the target access time TAT. If this is not the case, the message flow branches back to the normal operation when not in operating in suspend mode.

Otherwise the USIM 1 sends a polling message M5 to the remote server 4. This polling message M5 additionally comprises the suspend time range, or alternatively/additionally the negotiated suspension time period, for indicating to the remote server the recently applied suspension time.

In step S4 the remote server 4 then carries out analysis steps and if necessary calculates one of a new target access time TAT and/or a new suspension time function STF.

In conjunction with further exchanges as part of the remote control the remote server 4 submits these results to the USIM 1 as part of message M6, which of course might be an array of messages, preferably including response messages.

With the new parameter submitted with message M6 the sequence may start anew.

With this embodiment it is shown that an alignment of remote server operation and communication equipment/USIM communication can be achieved without big impact. After a couple of executions of the depicted sequence of messages, the communication will be well synchronized and both lead to a well-balanced power consumption and a well-balanced distribution of messages between remote server 4 and USIM 1.

Figure 3:
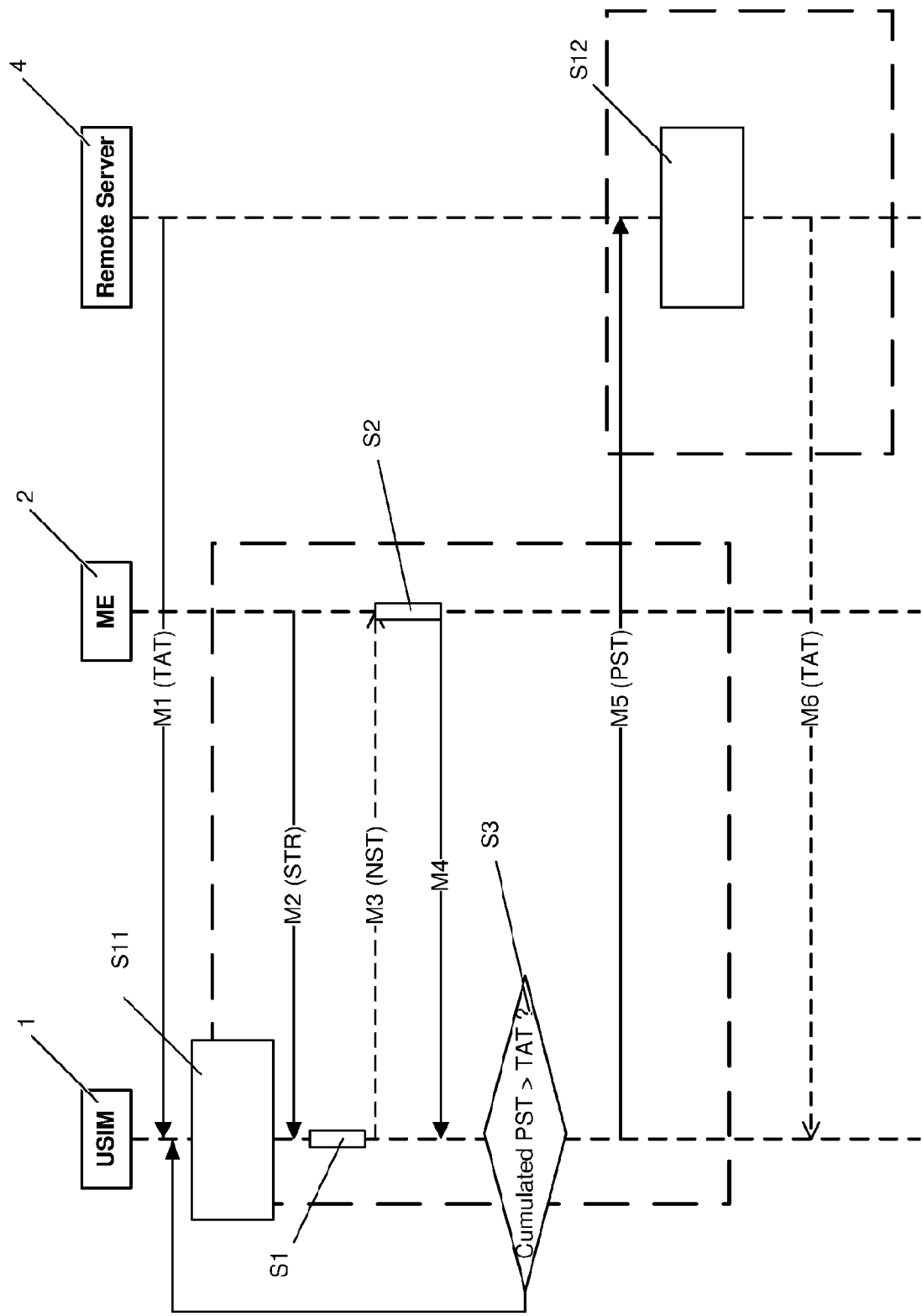
FIG. 3 shows a second sequence diagram showing an alternative message flow according to another embodiment of the inventive method.

An alternative embodiment of the sequence flow is shown in FIG. 3. It is on the first glance well alike the sequence flow of FIG. 2. However here are the differences.

The first message M1 is supposed to only provide the target access time, while no suspension time function or any additional parameters for it are provided. That is the main difference, as the remote server 4 is in this embodiment not responsible for how the USIM determines the negotiated suspension time period NST.

Instead the suspension time function STF is already available at the USIM 1. With the received target access time however the USIM evaluates in step S11 if the suspension time function STF needs to be adjusted in order to reduce the difference between accumulated suspension time periods and target access time TAT.

When this is done, the respective messages M2-M4 are exchanged.

Preferably in step S1 the USIM 1 additionally determines the negotiated suspension time period NST and a time period derived from the negotiated suspension time period, which is the predicted suspension time period PST, which might differ.

The accumulated predicted suspension time period PST is then evaluated in step S3 in comparison to the target access time TAT.

Additionally in step S12 at the remote server side now in response to the polling message M5 only the target access time may be adjusted considering the suspension time range and delivered back in message M6.

With that embodiment the same result is achieved, but with more involvement of the USIM 1, and the remote server 4 gets relieved from adjusting the suspension time function for a plurality of communication equipments and USIMs.

Figure 4:
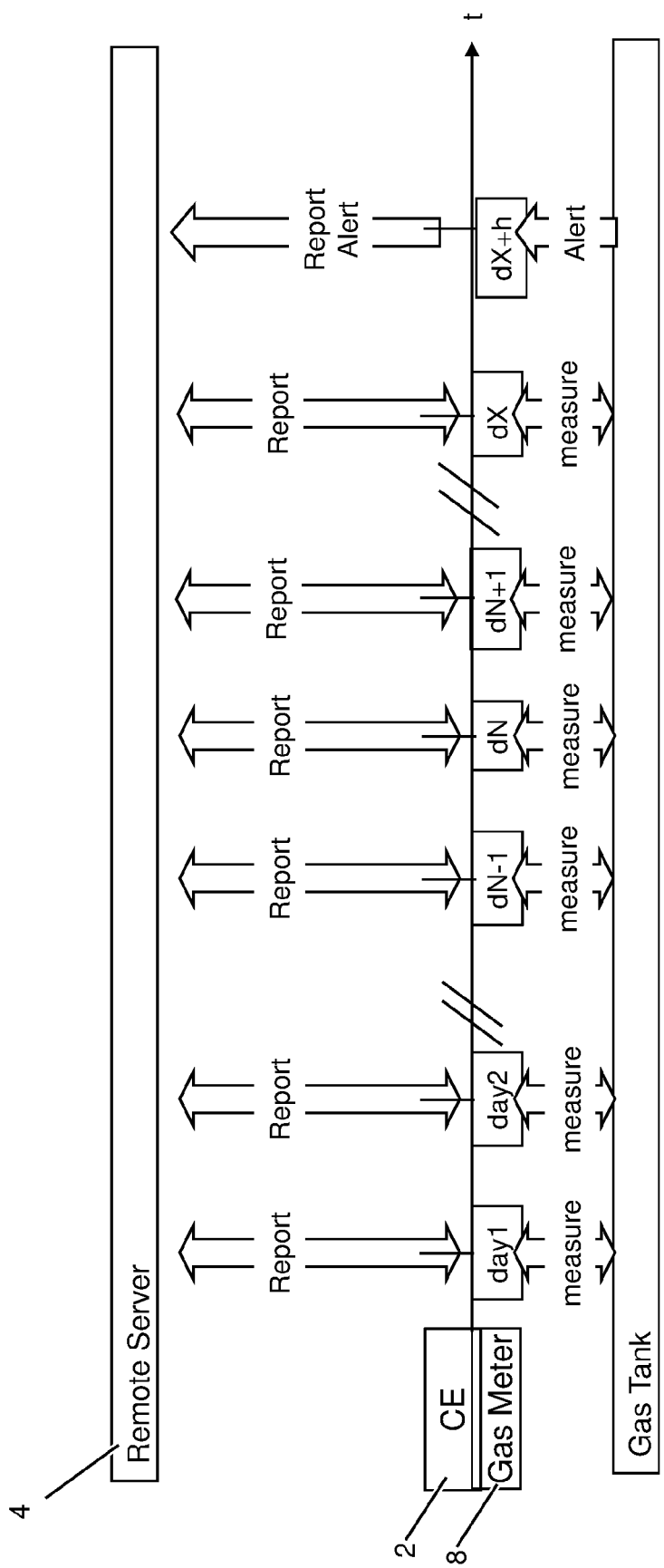
FIG. 4 represents the resulting reporting behavior over time according to a first embodiment of the invention.

The outcome of this message flow is shown in an exemplifying embodiment in FIG. 4.

FIG. 4 shows a typical IoT device behaviour in particular for measurement device providing regular update at predefined time towards a remote measurement and management server of the IoT device: that is a domain requirement. In this illustrative example a gas meter 8 is shown, without limiting the invention to such use cases.

FIG. 4 also shows that in such use case, alerts may be fired by the device based on domain specific rules at any time to the remote measurement and management server. The figure illustrates the general case where a measurement device only contacts its remote measurement and management server on a daily basis. This is the case for measurement reports. For an alert however the submission happens as shown in the end at a non-regular time, displayed by dayX+h, that means a fraction of a day. This typically happens triggered and not based on a given time scheduled.

Figure 5:
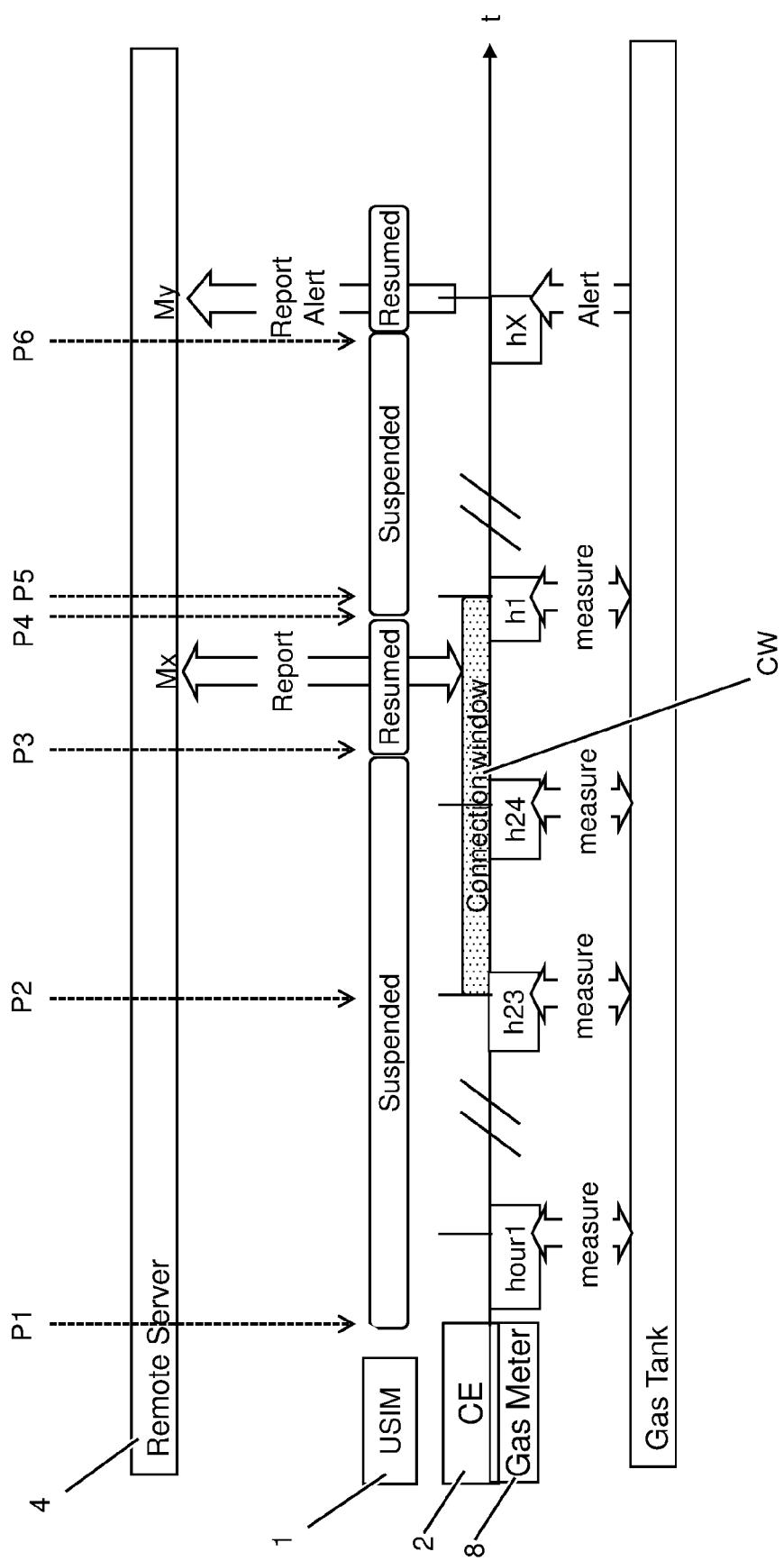
FIG. 5 shows the resulting reporting behavior over time according to a second embodiment of the invention.

In order to report its measurements to the remote measurement and management server, the IoT device needs to use its communication component i.e. a modem (communication equipment 2) connected to a subscriber identification module, that is further illustrated in FIG. 5. The domain specific remote measurement and management server may be the same or different server from the remote server described in this invention. For the sake of simplicity for this illustration, it is assumed thereafter that the invention remote server and the domain specific remote measurement and management are the same or collocated and called remote server, or in other words "remote server" in FIGS. 4 and 5 is able to performed the method described in this invention and the functions required by domain specific remote measurement and management server.

FIG. 5 shows for an example of a gas meter 8 how the inventive method achieves the envisaged results.

The components here are a gas meter 8 attached to a modem 2, which is the communication equipment in the previous exemplifying embodiment. The modem has connected a USIM 2. The modem and USIM are preconfigured with a target access time, preferably received from the remote server 4.

FIG. 5 shows the process over time from left to right. After negotiating a suspend time period (not shown) the modem 2 activates at point P1 the suspend mode. This is shown for the USIM 1 as being suspended.

The gas meter in the meantime however makes measurements at the gas tank e.g. each hour for being able to report the gas consumption. After the time depicted at point P2 (after 23 hours) the connection window CW is opening.

This connection window CW complements to the target access time period. It lasts 2 hours, and has a period of 22 hours, that potentially means each 22 hours the target access time period starts.

Now at point P3 the modem 2 resumes operation. It turns out that it is happening during the connection window CW. Hence a report of measurement data Mx is provided to the remote server 4.

Such report of data may also comprise information relating to the suspension time period. Consequently in response from the remote server an indication with regards to an adjusted target access time, that is related to the connection window, and/or an adjusted suspension time function is provided.

For the next period these received information are considered at the side of the USIM 1 and govern the suspension time which starts at point P4. The connection window ends at point P5.

It is visible that the connection window CW is longer than needed but may not be terminate earlier but start later. Should the accumulation of the suspension time period however last longer than 22 hours here another fine tuning needs to be carried out. With the exchanged information in regards to target access time and suspension time range this is easily figured out at the remote server 4 and/or the US IM 1.

Additionally it is shown that the modem is further configured to send messages to the remote server 4 outside of the connection window. This however only relates to alert messages provided with report alert message My. This does not change the situation that those alert messages are only provided during a resume phase of the modem 2 and the USIM 1.

It is to be noted that preferably the gas meter 8 decides when to access the remote measurement and management server to report its measurements (Mx) and alerts (My), during the connection window CW. The frequency of connection and the duration of the connection window are determined by the domain business rules. These connectivity needs determine the alternating suspension and resume periods of the modem 2 and the subscriber identification module.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

What is claimed is:

1. A Method to operate a subscriber identification module connected to a communication equipment, which is configured to operate in a cellular network, the subscriber identification module being communicatively coupled with a remote server, the method comprising the steps of:

receiving from the communication equipment an information element indicating a time range relating to a suspend time of the communication equipment, hereinafter the suspend time range, receiving from the remote server a target access time information element indicating an expected time for an access request from the subscriber identification module to the remote server, hereinafter the target access time, determining a suspension time period considering the suspend time range, providing to the communication equipment said suspension time period in response to receiving a suspend instruction from the communication equipment, in case, after resuming from the suspension instructed by the communication equipment, the accumulated duration of at least one successive time period(s) since target access time started exceeds the target access time, sending a polling message to said remote server by means of said communication equipment, responsive to executing a sequence of said polling messages leading to a balanced power consumption and a balanced distribution of messages between remote server and subscriber identification module, synchronizing both the suspension time period and the access time of said polling message between the communication equipment and the remote server.

2. The Method according to claim 1, wherein the polling message comprises a request for at least one remote control instruction, and the method further comprises the steps of receiving a response message comprising at least one remote control instruction, and carrying out said at least one remote control instruction.

3. The Method according to claim 2, wherein the step of sending the polling message comprises sending an indication relating to at least one of the suspend time range and the suspension time period, the method further comprising the step of receiving an updated target access time information element in response to the polling message.

4. The Method according to claim 2, wherein the step of determining the suspension time period is carried out by means of a suspension time function, comprising the step of adjusting the suspension time function considering at least one of:
the actual access time period,
the updated target access time information element,
the target access time information element, the suspend time range,
the suspension time period and
the time period derived from the suspension time period.

5. The Method according to claim 4,
wherein the step of receiving an updated target access information element further comprises receiving at least one instruction for adjusting the suspension time function.

6. The Method according to claim 1,
wherein a time period derived from the suspension time period equals the suspension time period.

7. The method of claim 1 wherein the remote server is accessible by a cellular network, communicatively coupled to at least one subscriber identification module connected to a communication equipment which is configured to operate in said cellular network,
wherein the remote server is configured to:
provide a target access time information element indicating an expected time for an access request, hereinafter the target access time, to said subscriber identification module, and
receive a polling message at said target access time.

8. The method according to claim 7,
where said polling message further comprising an indication relating to the suspension time period, wherein the remote server is further configured to:
determine an updated target access time information element, and
provide said updated target access time information element in response to said polling message to the subscriber identification module.

9. The method according to claim 7,
wherein the remote server is further configured to consider at least one of the received indication relating to the suspend time period and the target access time for determining and submitting to the subscriber identification module at least one instruction to the subscriber identification module.

10. The method of claim 1, further comprising minimizing the power consumption and a radio resource usage of the communication equipment by limiting said polling message to a strict minimum consisting of:
one UDP request packet from One UDP request packet from USIM to remote server; and
one UDP packet response by remote server back containing said access time to remote server.

11. The method of claim 1, further comprising
delivering the suspension time function to the subscriber identification module when it is issued, and
launching the suspension time function by way of a cellular network operation.

12. A Subscriber identification module connected to a communication equipment, which is configured to operate in a cellular network, wherein the subscriber identification module is communicatively coupled with a remote server,
wherein the subscriber identification module is configured to:
receive from the communication equipment an information element indicating a time range relating to a suspend time of the communication equipment, hereinafter the suspend time range,
receive from the remote server a target access time information element indicating an expected time for an access request from the subscriber identification module to the remote server, hereinafter the target access time,
determining a suspension time period considering the suspend time range,
provide to the communication equipment said suspension time period in response to the reception of a suspend instruction from the communication equipment,
in case after resuming from the suspension instructed by the communication equipment, the accumulated duration of one or more successive time period(s) since target access time started exceeds the target access time,
send a polling message to said remote server by means of said communication equipment, said subscribed identification module being configured to, responsive to executing a sequence of said polling messages leading to a balanced power consumption and a balanced distribution of messages between remote server and subscriber identification module, synchronizing both the suspension time period and the access time of said polling message between the communication equipment and the remote server.

13. The Subscriber identification module according to claim 12,
wherein the polling message comprises sending an indication relating to at least the suspend time range, and a request for at least one remote control instruction,
and the subscriber identification module is configured to receive in response to the polling message a response message comprising at least one remote control instruction, and to carry out said at least one remote control instruction,
wherein said remote message further comprising an updated target access time information element.

14. The Subscriber identification module according to claim 12,
further configured to employ for determining the suspension time period is a suspension time function,
wherein for adjusting the suspension time function the subscriber identification module is configured to consider at least one of:
the actual access time period
the updated target access time information element,
the target access time information element,
the suspend time range,
the suspension time period and
the time period derived from the suspension time period.

* * * * *